June 9, 1964    W. LÜTZE ETAL    3,136,129
HYDRODYNAMIC COUPLING
Filed June 15, 1959
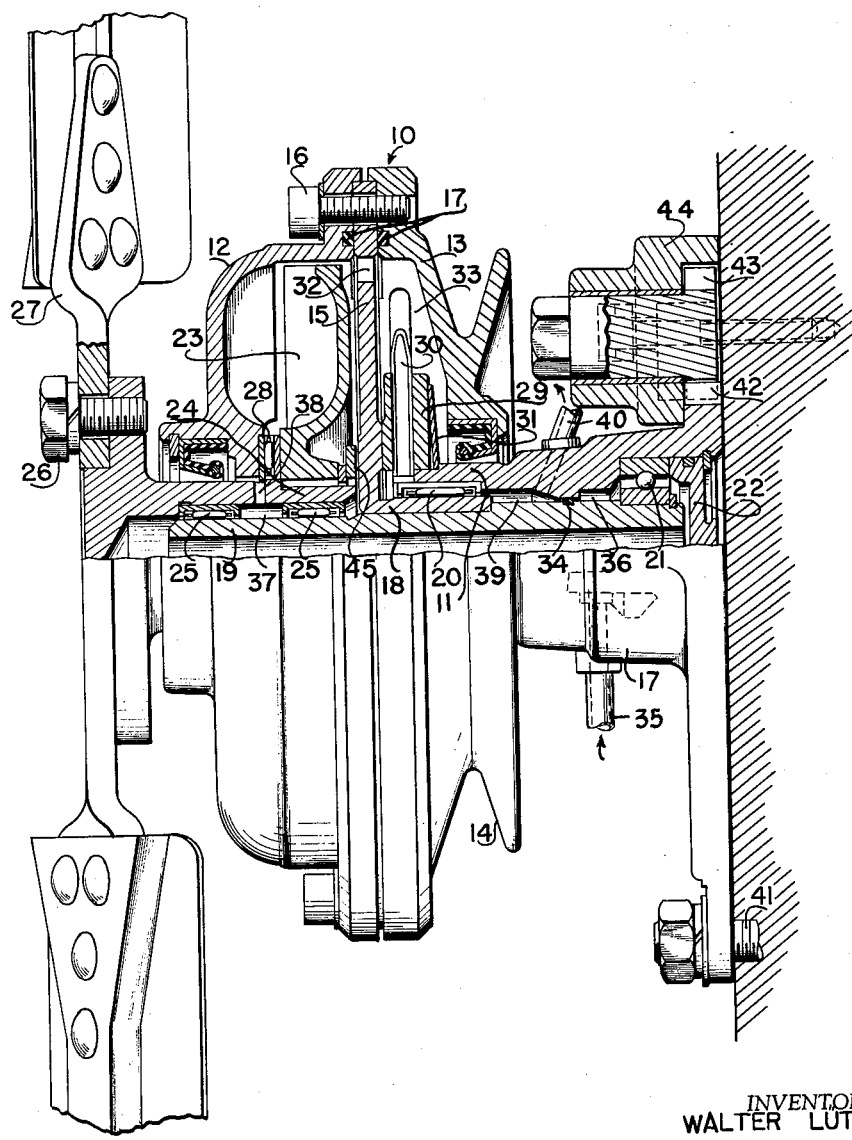
INVENTORS
WALTER LÜTZE
OTTO RÖDER
BY Dicke, Craig and Freudenberg
ATTORNEYS

United States Patent Office 3,136,129
Patented June 9, 1964

3,136,129
HYDRODYNAMIC COUPLING
Walter Lütze, Oberesslingen, and Otto Röder, Fellbach, near Stuttgart, Germany, assignors to Daimler-Benz Aktiengesellschaft, Stuttgart, Germany
Filed June 15, 1959, Ser. No. 820,428
Claims priority, application Germany June 21, 1958
9 Claims. (Cl. 60—54)

The present invention relates to a hydrodynamic coupling, especially for adjustably coupling a ventilator or fan to the drive thereof in an internal combustion engine provided with a housing enclosing the turbine wheel or impeller and serving as drive for the pump wheel or impeller thereof, whereby both the driving and driven wheels of the hydrodynamic coupling, namely the impeller and turbine wheel are emplaced from one end thereof over the free end of a stationary axle member or spindle stump serving as bearing support therefor, of the type disclosed in the patent application Serial No. 681,617, filed September 3, 1957, and entitled "Hydrodynamic Clutch and a Driving System Including Such Clutch," now Patent No. 3,058,296, issued October 16, 1962.

The present invention is concerned with an improvement of the arrangement of the type disclosed in the aforementioned copending application, especially as regards the structural assembly thereof. This is achieved in accordance with the present invention in that the relatively stationary axle member is constructed as hollow bearing pin member, while the pump wheel or impeller is operatively connected with a shaft and together with this shaft is supported within the hollow bearing pin member whereby the shaft in its turn serves as bearing support for the turbine wheel or driven member of the hydrodynamic coupling.

A construction and assembly is made possible in accordance with the present invention in which the pump wheel or driving member consists of a housing part and of a cover while a radially extending supporting disk member for the operative connection with the shaft to provide rotation in unison therewith is arranged between these two parts. The shaft thereby extends from the supporting disk member axially in both directions thereof, on the one hand, to form thereby the bearing support within the hollow bearing pin member of the spindle member and, on the other, for accommodating a hub part of the turbine wheel passing over into the ventilator or fan or operatively connected therewith.

The construction according to the present invention results in a simplified assembly, better bearing lubrication and smaller loads in the bearings between the turbine wheel and pump wheel. Furthermore, the possibility exists in a construction according to the present invention to extend the shaft of the pump wheel in the direction opposite to the fan or ventilator beyond the hollow bearing pin member for purposes of driving a cooling-medium pump or the like.

According to the present invention, a relatively stationary scoop-tube support member provided with a plurality of stationary scoop tubes may be arranged at the free end of the stationary hollow bearing pin member, which is sealed against the supporting disc member, while the supporting disc member is provided with apertures for the passage of the fluid medium for the hydraulic coupling out of the coupling into the space of the scoop tubes. One end face each at the supporting disc member and the scoop-tube support member acts thereby as sealing surface and the scoop-tube support member is pressed, for example, by means of a spring into sealing engagement against the supporting disc member.

The stationary hollow bearing pin member is sealed off at a place between the securing of the bearing disc member and the seal thereof with respect to the shaft serving as bearing support for the pump wheel, and the scoop tubes terminate or discharge with the annular space disposed between this seal and the bearing disc member which annular space also forms the outlet or discharge space of the fluid medium of the hydraulic coupling.

For the supply of the fluid medium to the hydraulic coupling, a bore is arranged in the stationary hollow bearing pin member between the seal and the clamping place which bore is operatively connected over an annular space and the shaft constructed in a hollow member with a further annular space disposed between the shaft and the hub portion of the turbine wheel which further annular space, in its turn, is operatively connected, for example, by means of appropriate bores with the inner space of the hydraulic coupling.

The further advantage results from the use of a construction in accordance with the present invention that the bearings between the stationary hollow bearing pin member and the shaft supporting the pump wheel as well as the bearings between the shaft and the hub portion of the turbine wheel may be arranged within the annular spaces which are traversed by the fluid medium for the hydrodynamic coupling. A very intensive bearing lubrication is assured by such an arrangement.

Accordingly, it is an object of the present invention to provide a hydrodynamic coupling for operatively connecting a driving member with a driven member, for example an internal combustion engine with the blower or fan thereof, which is simple in construction, enables relatively rapid and inexpensive assembly, and in which the individual parts may be readily and inexpensively manufactured.

Another object of the present invention is the provision of a hydrodynamic coupling between a driving and driven member which may be readily assembled and which minimizes the loads and thrusts on the bearings.

A further object of the present invention resides in the provision and arrangement of a hydrodynamic coupling and bearings therefor which results in a purposeful arrangement and in an intensive lubrication of all the bearings.

These and other objects, features and advantages of the present invention will become more obvious from the following description when taken in connection with the accompanying drawing which shows, for purposes of illustration only, one embodiment in accordance with the present invention and wherein the single figure illustrates a longitudinal axial cross-sectional view through the hydrodynamic coupling in accordance with the present invention.

Referring now to the drawing, reference numeral 10 generally designates therein the hydrodynamic coupling. The projecting end of an axle member or spindle 11 serves as bearing support for the hydrodynamic coupling 10, for example, at the engine block or any other suitable housing part whereby the axle member 11 is constructed as a hollow bearing pin member. The driving member or pump wheel of the hydrodynamic coupling 10 is formed of two parts and consists of a housing portion 12 simultaneously forming the blade means and a cover portion 13 which simultaneously forms the V-shaped groove 14 for accommodating therein the V-shaped driving belt (not shown) or the like.

A radially extending supporting disc member 15 is arranged between the two parts 12 and 13 of the pump wheel and is rigidly connected by means of a bolted connection 16 or the like with both parts consisting of the housing part 12 and of the cover 13, possibly, by the interposition of appropriate seals 17. The bearing disc member 15 passes over along the radially inner end thereof into a hub portion 18 by means of which it is non-rotatably supported in any suitable conventional member, for example, by shrink fit, splined connection or the like, on a hollow shaft 19. The entire pump wheel assembly 12, 13, 15, 18, together with the hollow shaft member 19 is inserted into the hollow stationary bearing pin member 11 and is supported therein by means of two bearings 20 and 21. A disc member 22 closes off the hollowing bearing pin member 11 toward the side of the engine.

The hollow shaft member 19 extends from the bearing disc member 15 axially toward both sides thereof. The turbine wheel 23 is rotatably supported with the hub portion 24 thereof by means of bearings 25 on the part of shaft 19 disposed on the opposite side of the support thereof within the hollow bearing pin member 11. The hub portion 24 is operatively connected in any suitable manner, for example, by a threaded or bolted connection 26 with the fan wheel 27 carrying the fan blades. The hub portion 24, however, may also pass over directly into the fan itself by being formed integrally therewith. The turbine wheel 23 may be supported against the pump wheel assembly 12, 13, 15 by means of an axial bearing 28. The axial bearing 28 thereby absorbs the axial thrust during operation of the hydrodynamic coupling. A bearing support with respect to the bearer disc member 15 also takes place by means of an axial bearing 45 whereby the axial bearing absorbs the thrust during idling or during standstill of the fan. The axial bearing 45 may thereby be constructed as a glide bearing.

A scoop-tube support member 29 provided with a plurality of scoop tubes 30 is non-rotatably secured in any suitable manner at the free end of the hollow bearing pin member 11. The scoop-tube support member 29 is urged by a spring 31 into sealing engagement against the supporting disc member 15 whereby an end face each at the supporting disc member 15 and at the scoop-tube support member 29 are effective as sealing surfaces. The supporting disc member 15 is provided along the outer side thereof with apertures 32 so that the fluid medium of the hydrodynamic coupling may flow from the hydrodynamic coupling into the space 33 for the scoop tubes 30.

The hollow bearing pin member 11 is sealed with respect to the hollow shaft 19 at a place between the bearing disc member 15 and its securing at the engine block by means of a seal 34. Intermediate the seal 34 and the place the hollow pin member 11 is secured to the engine block is arranged a bore 35 for the supply of the fluid medium to the hydrodynamic coupling 10. The fluid medium thereby flows over bore 35 into annular space 36 and through the bearing 21, the hollow shaft 19 in the direction toward the fan end thereof into a second annular space 37 formed intermediate the hollow shaft 19 and the hub portion 24 of the turbine wheel 23. The bearings 25 for the turbine wheel 23 are also arranged within the annular space 37 so that the bearings 25 are also traversed by the fluid medium for the hydrodynamic coupling 10 and are thereby also lubricated. The fluid medium for the hydrodynamic coupling 10 is permitted to enter the hydrodynamic coupling 10 through bores 38 whereby the axial bearing 28 is also lubricated. A regulating valve which is manually or automatically adjustable may be arranged in the supply line of the fluid medium for purposes of adjusting the hydrodynamic coupling whereby the cross-section thereof may be automatically adjusted, for example, in dependence on the temperature of the cooling medium of the internal combustion engine in any conventional manner.

The fluid medium leaves the hydrodynamic coupling 10 through bores 32 provided in the bearing disc member 15 and flows over into the space 33 and is scooped up therein through the scoop tubes 30 into an annular space 39 in which is also arranged the bearing 20. Consequently, the bearing 20 is also supplied with lubricant. The annular space 39 is disposed between the supporting disc member 15 and the seal 34. A bore 40 provided in the bearing pin member 11 forms the discharge aperture.

In order to achieve an automatic adjustment of the clutch for increased slippage with an increase in the rotational input or driving speed, a constant flow resistance (not illustrated in the drawing), for example, in the form of a stationary nozzle may be provided in the discharge of the fluid medium system. Furthermore, the scoop tubes 30 themselves may form the flow resistance by an appropriate dimensioning of the cross sections thereof. An excess pressure valve may be arranged thereby in parallel with this flow resistance means for limiting the maximum rotational speed.

For purposes of adjusting and readjusting the tension of the driving belt for the drive of the hydrodynamic coupling, the hollow bearing pin member 11 may be constructed as a structural part separate from the engine block. It may thereby be constructed in a segment-shaped manner and is pivotally secured as at 41 at the engine block in any suitable manner. A toothed connection 42 into which engages a gear wheel 43 thereby serves for purposes of pivotal movement. The gear wheel 43 is secured in a projecting portion 44 of the engine block whereby the projecting portion 44 simultaneously extends above the upper rim of the segment forming the hollow pin member 11. The projecting portion 44 is adapted to be rigidly clamped against the engine block, for example, by means of appropriate bolts. Only upon loosening the bolts may the gear wheel 43 be rotated whereby the belt tension may be changed by the adjustment of the segment forming the hollow bearing pin member 11.

While we have shown and described one embodiment in accordance with the present invention, it is understood that the same is not limited thereto but is susceptible of many changes and modifications within the spirit and scope of the present invention, and we, therefore, do not wish to be limited to the details shown and described herein but intend to cover all such changes and modifications as are encompassed by the scope of the appended claims.

We claim:

1. A hydrodynamic coupling containing a fluid medium comprising a relatively stationary part, hollow support spindle means secured adjacent one end to said part, input means including a housing defining an inner space, disc means supporting said housing and dividing said space into two communicating chambers, and pump rotor means connected with said housing and arranged within one of said chambers, an axial shaft journalled at one end in the hollow of said spindle means, and said supporting disc means being secured to said axial shaft, said one of the two chambers constituting the work chamber for said coupling, the portion of said housing defining said work chamber forming the shell for said pump rotor means, output means including an output shaft and turbine rotor means operatively connected to said output shaft for driving the same, said turbine rotor means being arranged within said work chamber and being operatively associated with said pump rotor means, said output shaft being journalled on the end of said axial shaft opposite said spindle means and supported thereby in an over-hang arrangement, and scoop means supported by said spindle means within the other of said two chambers, including a relatively stationary scoop tube support member supported by said hollow support means at the free end thereof and provided with a plurality of stationary scoop tubes, and means for sealing said scoop tube support member against said supporting disc means including means urging said scoop tube support member into sealing engagement against said supporting disc means, one end face each at said scoop tube support member and at said supporting disc means serving as sealing surface, said supporting disc means being provided with apertures for the passage of fluid medium from said work chamber into the chamber in which said scoop tubes are arranged.

2. A hydrodynamic coupling according to claim 1, wherein said means urging said scoop tube support member includes a spring.

3. A hydrodynamic coupling containing a fluid medium comprising a relatively stationary part, hollow support spindle means secured adjacent one end to said part, input means including a housing defining an inner space, disc means supporting said housing and dividing said space into two communicating chambers, and pump rotor means connected with said housing and arranged within one of said chambers, an axial shaft journalled at one end in the hollow of said spindle means, and said supporting disc means being secured to said axial shaft, said one of the two chambers constituting the work chamber for said coupling, the portion of said housing defining said work chamber forming the shell for said pump rotor means, output means including an output shaft and turbine rotor means operatively connected to said output shaft for driving the same, said turbine rotor means being arranged within said work chamber and being operatively associated with said pump rotor means, said output shaft being journalled on the end of said axial shaft opposite said spindle means and supported thereby in an over-hang arrangement, scoop means supported by said spindle means within the other of said two chambers including a relatively stationary scoop tube support member supported by said hollow support means at the free end thereof and provided with a plurality of stationary scoop tubes and means for sealing said scoop tube support member against said supporting disc means, said supporting disc means being provided with apertures for the passage of fluid medium from said work chamber into the chamber in which said scoop tubes are arranged, seal means at a place intermediate the end of said hollow support means where it is secured to said relatively stationary part and the fastening of said supporting disc means to seal said hollow support means with respect to said axial shaft, an annular space being formed intermediate said last-mentioned seal means and said supporting disc means, said scoop tubes discharging into said annular space, and discharge means for the fluid medium of said hydrodynamic coupling to provide an outlet therefor from said annular space.

4. A hydrodynamic coupling according to claim 3, wherein said hollow support means is provided with an inlet aperture intermediate said last-named seal means and said end where it is secured to said relatively stationary part, a further annular space being formed intermediate said axial shaft and said output shaft of the output means, said further annular space being in communication with said first-mentioned annular space through said axial shaft which is of hollow construction, and bore means operatively connecting said further annular space with the interior space of said work chamber.

5. A hydrodynamic coupling according to claim 4, further including first bearing means rotatably supporting said axial shaft within said hollow support means and second bearing means rotatably supporting said output shaft on said axial shaft, said first and second bearing means being arranged respectively in said first and further annular spaces to receive lubrication by the flow of the fluid medium of said hydrodynamic coupling therethrough.

6. A hydrodynamic coupling according to claim 5, further comprising axial bearing means for supporting said turbine rotor means against said pump rotor means to absorb therein the axial thrusts.

7. A hydrodynamic coupling according to claim 6, further including second axial bearing means supporting said turbine rotor means against said supporting disc member to absorb axial thusts.

8. A hydrodynamic coupling containing a fluid medium, comprising a relatively stationary part, hollow support spindle means secured adjacent one end to said part, input means including a housing defining an inner space, disc means supporting said housing and dividing said space into two communicating chambers, and pump rotor means connected with said housing and arranged within one of said chambers, said housing having a portion thereof extending over said hollow support means, an axial shaft journalled at one end in the hollow of said spindle means, said supporting disc means being secured to said axial shaft, said one of the two chambers being the work chamber for said coupling, the other of said two chambers being defined by the portion of said housing extending over said support means, the portion of said housing defining said work chamber forming the shell for said pump rotor means, said portion of said housing extending over said support means being operatively connected to means for driving said input means, output means including an output shaft and turbine rotor means operatively connected to said output shaft for driving the same, said turbine rotor means being arranged within said work chamber and being operatively associated with said pump rotor means, said output shaft being journalled on the end of said axial shaft opposite said spindle means and whereby both said pump rotor means and said turbine rotor means are supported by said hollow support means in an over-hang arrangement, scoop means supported by said spindle means within the other of said two chambers, said means for driving said input means including a belt-driven pulley formed by said portion of the housing extending over said hollow support means and belt means driving said pulley, said hollow support means being a separate structural part provided with a toothed segment, and means pivotally securing said hollow support means at said relatively stationary part about a pivot axis radially spaced from the axis of said hollow support means, a gear wheel rotatably supported on an axle fixed to said relatively stationary part, and means for selectively preventing rotation of said gear wheel, said toothed segment engaging with said gear wheel to enable re-adjustment of the belt tension for the belt drive of said pulley.

9. A hydrodynamic coupling containing a fluid medium adapted for a fan drive, comprising a relatively stationary part, hollow support spindle means secured adjacent one end to said part, input means including a housing defining an inner space, said housing being divided into two portions, a coupling support member comprising rigid disc means supporting said housing and dividing said space into two communicating chambers each formed by a respective housing portion, means detachably securing said housing portions to said supporting disc means on opposite sides thereof, and pump rotor means connected with said housing and arranged within one of said chambers, one of said housing portions extending over said hollow support means, an axial shaft journalled at one end in the hollow of said spindle means, said supporting disc means being secured to said axial shaft in the mid-section thereof, said one of the two chambers being the work chamber for said coupling, the other of said two chambers being defined by the said one portion of said housing extending over said support means, the other portion of said housing defining said work chamber and forming the shell for said pump rotor means, said one portion of said housing extending over said support means being operatively connected to means for driving said input means, output means adapted to drive the fan including an output shaft and turbine rotor means operatively connected to said output shaft for driving the same, said turbine rotor means being arranged within said work chamber adjacent said supporting disk means and being operatively associated with said pump rotor means, said output shaft being journalled on the end of said axial shaft opposite said spindle means, whereby both said pump rotor means and said turbine rotor means are supported by said hollow support means in an over-hang arrangement, and scoop means detachably supported on said spindle means within the other of said two chambers including a relatively stationary scoop tube support member slidably supported on said hollow support means at the free end thereof adjacent said supporting disc means, a plurality of stationary scoop tubes secured to said support member, and means for sealing said scoop tube support member against said supporting disc means, said supporting disc means being provided with apertures for unrestricted passage of fluid medium from said work chamber into the chamber in which said scoop tubes are arranged.

References Cited in the file of this patent

UNITED STATES PATENTS

| | | |
|---|---|---|
| 1,859,607 | Sinclair | May 24, 1932 |
| 1,986,568 | Fink | Jan. 1, 1935 |
| 2,289,440 | Kugel | July 14, 1942 |
| 2,491,483 | Dolza et al. | Dec. 20, 1949 |
| 2,622,712 | Becker | Dec. 23, 1952 |
| 2,630,683 | Wemp | Mar. 10, 1953 |
| 2,633,697 | Johnson | Apr. 7, 1953 |
| 2,635,429 | Norwood | Apr. 21, 1953 |
| 2,719,616 | Ahlen | Oct. 4, 1955 |
| 2,761,432 | Claas | Sept. 4, 1956 |
| 2,768,501 | Muller | Oct. 30, 1956 |
| 2,841,959 | Snow | July 8, 1958 |
| 2,878,642 | Maurice et al. | Mar. 24, 1959 |

FOREIGN PATENTS

| | | |
|---|---|---|
| 765,668 | Great Britain | Jan. 9, 1957 |